Sept. 14, 1948.  H. A. SNECKNER  2,449,255
WORK-HOLDING DEVICE
Filed Dec. 11, 1944  2 Sheets-Sheet 1
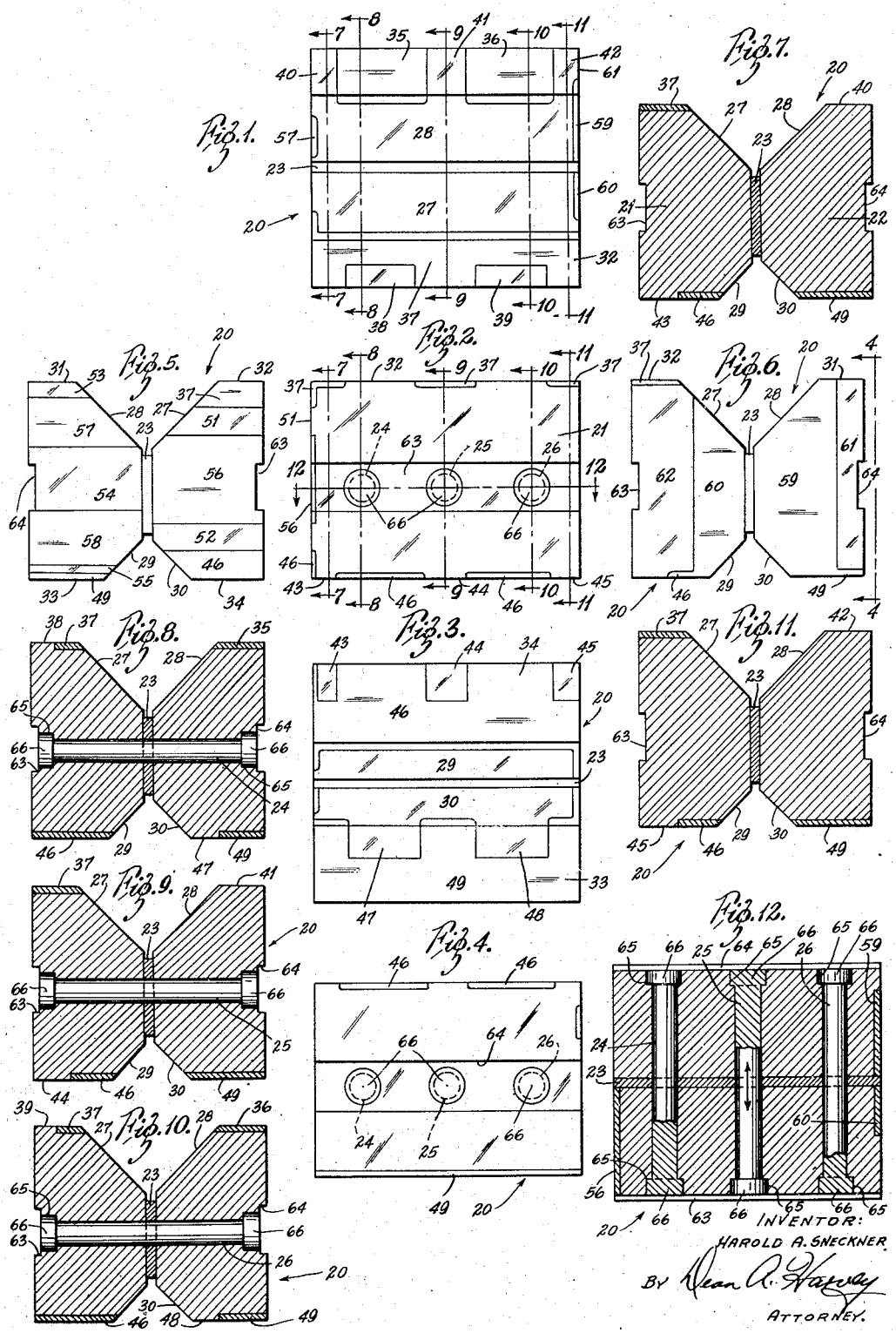
INVENTOR:
HAROLD A. SNECKNER
BY Dean A. Harvey
ATTORNEY.

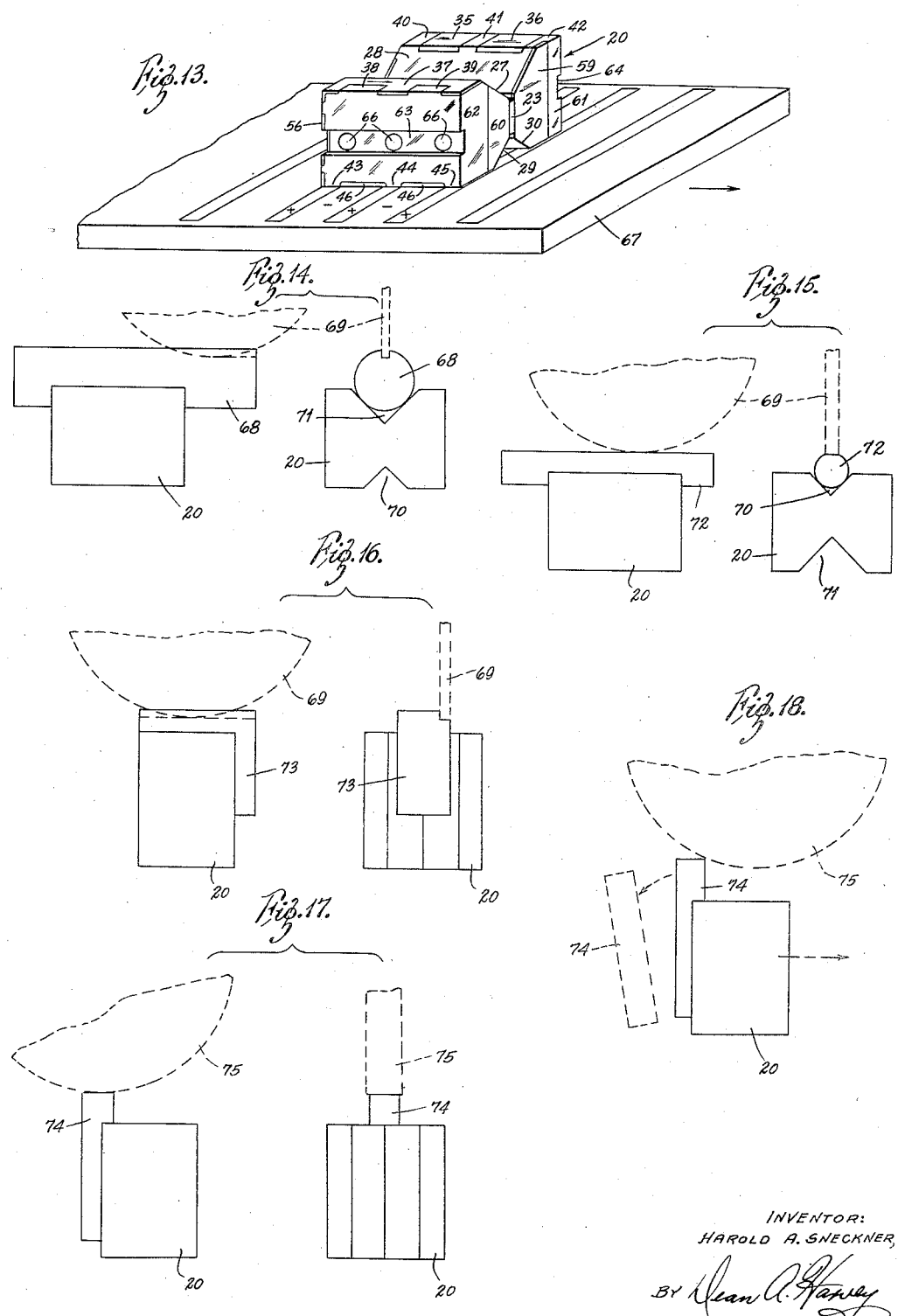

Patented Sept. 14, 1948

2,449,255

UNITED STATES PATENT OFFICE 2,449,255

WORK-HOLDING DEVICE

Harold A. Sneckner, Richmond Heights, Mo., assignor to Clark F. Ross, Richmond Heights, Mo.

Application December 11, 1944, Serial No. 567,715

4 Claims. (Cl. 175—367)

This invention pertains to work-holding devices generally, and more particularly concerns itself with an improved magnetic V-block and method of making the same.

The magnetic V-block is well known in the work-holding art and finds its principal use as an adjunct to magnetic chucks. Essentially, it comprises a means for guiding the magnetic forces generated in the chuck up and into a work-piece so shaped as to be incapable of being held by the chuck itself. In the more common types of the prior art devices, two ferromagnetic bars are arranged in parallel to present angular faces each with the other and are separated by a non-magnetic strip. The bearing surfaces of each bar are channeled or arched to form contact points for alternate poles of the magnetic chuck, and the points of one are staggered with those of the other, so that the bars act as two opposite magnetic poles. The entire assembly is held together by non-magnetic screws, and the work-piece is held for light machining or grinding in the V formed by the opposed angular surfaces of the two bars.

Actual shop use of these blocks has presented a number of problems which heretofore have not been solved. For example, all prior devices are limited to holding work in one plane, though it is often necessary in the grinding art to finish surfaces on the same stock which are at an angle with each other. Under present practice, the magnetic V-block is used as an ordinary jig and the work-piece is clamped in the V for end grinding.

Also, the arches or open spaces in the supporting surfaces of the parallel bars present a number of sharp corners which are easily upset and cause the block to be inaccurate. Moreover, these spaces collect metallic cuttings which weaken the block as a magnet and interrupt its external faces as smooth, accurate bearing means.

A structural problem has long been present in finding a suitable method for securing the parallel bars together. Prior art methods of holding them with screws, or riveting them in the ordinary sense, have been unsuccessful, since, with continued use, the fastenings loosen permitting malalignment of the bars. Also, the bars and the separator have different coefficients of expansion, and radical temperature changes, to which the block is continuously subjected, contribute to the loosening of the parts.

By substantial improvements in structure and methods, I have produced a block which overcomes the aforementioned difficulties and the broad purpose of the invention may be expressed in terms of this result. Succinctly, the general aim of the invention is to provide an improved magnetic V-block.

More specifically, it is a purpose of the invention to perfect a magnetic holding device for use with magnetic chucks, the bearing surfaces of which contain no recess, channel, or other opening capable of interrupting the smooth continuous lines thereof, or presenting pockets for the collection of metal cuttings, grit, or other foreign matter.

It is a further object of the invention to provide a V-block capable of holding a work-piece in more than one position magnetically, and without the use of clamps.

Yet another object of the invention is to perfect a magnetic work-holding device which in effect is a solid unitary mass.

Other objects and advantages of the invention will be pointed out in the following specification of which the accompanying drawings form a part and in which:

Figs. 1, 2, 3, and 4 are, respectively, a plan, front, bottom and rear view of a V-block, positioned as in Fig. 13, representing the invention in its preferred form;

Figs. 5 and 6 are, respectively, left and right end views of a block so positioned;

Figs. 7–11 inclusive are cross-sectional views of the block taken along the lines indicated by corresponding numerals in Figs. 1 and 2, illustrating a manner in which the non-magnetic inlays may be positioned in the block;

Fig. 12 is a cross-sectional view taken along the line 12—12 of Fig. 2 showing means for securing the parallel bars of the block together;

Fig. 13 is a perspective view illustrating the block in position on a magnetic chuck; and Figs. 14 to 18 inclusive are diagrammatical sketches illustrating novel features of the invention. Like reference numerals have been used in the different views to designate like parts.

As illustrated in Figs. 1–12, the block 20 comprises two parallel bars 21 and 22, and a separator 23. The bars are made from metal exhibiting magnetic properties, the separator from non-magnetic material, and the parts held together by three pins 24, 25, and 26, also of non-magnetic material. The bars are shaped with two pairs of faces 27—28 and 29—30 (Fig. 7) which, in their assembled position, form a large and a small channel along the length of the block, having a V-shaped cross-section.

Four faces 31, 32, 33, and 34, together with the end faces shown in Figs. 5 and 6, form the bearing surfaces upon which the block rests when used with a magnetic chuck. The respective bearing surfaces of each of the two parallel bars are broken by spaced cut-away sections provided to contain inlays of non-magnetic material, and the alternately exposed surfaces of the bars form contact points for magnetic connections with the poles of the chuck. The cut-outs are arranged so that the contact points of each bar are staggered with those of the other, thus permitting the magnetic material of each to rest on opposite alternate poles of the chuck. In this manner a magnetic circuit is closed from one group of chuck poles, through one bar, thence through the work-piece carried in either V or on either end depending on the position of the block, thence through the other bar to the second group of opposite chuck poles.

In the embodiment of the invention illustrated, which shows only one of numerous arrangements that may be made, the face 31 is broken by two cut-out sections providing recesses for the non-magnetic inlays 35 and 36 (Fig. 1). Likewise, a section extending the full length of face 32 is removed for the inlay 37, thus forming the contact points 38 and 39 for the surface 32 of the bar 21 and the points 40, 41 and 42 for the face 31 of the bar 22. Similarly, the contact points 43, 44 and 45 and the inlay 46 are formed for the surface 34 of the bar 21, and the contact points 47 and 48, and the inlay 49 for the face 33 of the bar 22. The ends of the block are also provided with contact points and inlays. For the end of the bar illustrated in Fig. 5, the sections 51, 52, 53, 54, and 55 represent contact points and the areas 56, 57, and 58, inlays. The remaining areas are right angle extensions of the inlays described for faces 32, 33, and 34 correspondingly numbered. The end inlays 59 and 60, shown in Fig. 6, extend to and join the face inlays 49 and 46, respectively, exposing the areas 61 and 62 as contact points. Further, it is obvious that the uninsulated surfaces of the faces 27, 28, 29, and 30 form contact areas for the stock that is being held in the V's. The front and rear faces of the block are interrupted by channels 63 and 64 provided for clamps when the device is used, without magnetic forces. The characteristics of the pins used to hold the assembly together are clearly shown in Fig. 12, but they will be described more fully in connection with the method recitation which follows.

While it is not intended to limit the invention to the use of any particular material, the bars 21 and 22 may be formed from cold rolled steel and the separator 23 from non-magnetic stainless steel. The non-magnetic inlays and pins may be made from any suitable material providing it has a coefficient of expansion substantially the same as that of the metal used in the bars. In practice, it has been found that a bronze alloy, such as that found in welding rods, is suitable. This is particularly true, since its color contrasts with that of the cold rolled steel, makes the lines of demarcation between the two metals distinct and thus facilitates the alignment of the block on the poles of the chuck.

With the materials properly selected, the faces and cut-outs of the bars 21 and 22 are milled to fractional dimensions and the surfaces of the separator ground smooth and true. Next all inlays are fused into the cut-outs in the bars, care being taken to make the welds absolutely solid and to build them above the outlines of the bars. Preparatory to assembling the block, the surfaces of the bars abutting the separator 23 are ground smooth and true and the holes in which the pins 24, 25, and 26 are inserted are drilled through the entire assembly. The apertures of these holes made at their termination with the channels 63 and 64 are then counterbored with a bottom drill having a diameter in the order of .005" greater than that used to bore the holes. This forms a cylindrical recess 65 at the mouth of each hole in which a head 66 for each pin is formed. The pins are then placed in the holes provided and are so dimensioned as to fit tightly therein and to extend slightly beyond the bottom face of the channels. The final step in assembling the block is accomplished with a power press which brings the parts together under a force sufficient to upset the ends of the pins to form the heads 66 and to set up compressive stresses in the parallel bars. Under the compressive forces thus established, tensile stresses (see arrow) are continuouly active in the pins 24, 25, and 26 to hold the bars together. Another method of assembling the parts which has been found successful is to join the bars to the separator by means of silver solder.

After the block has been assembled it remains only to rough mill its faces into parallelism and to finish it by grinding to the desired tolerances.

Through this improved method of assembling the block it has been possible to greatly reduce the area of the joining surfaces of the bars with the separator. This has made it possible to construct the block with a small and large V capable of accommodating different size stock. It has also been found that the presence of the inlays makes it possible to greatly reduce the depth of the cut-outs thereby increasing the volume of the magnetic bodies and increasing the magnetic strength of the block.

In operation, the block is used in a conventional and well known manner, which requires no elucidation. Certain novel features may be treated, however, and they will be described with the aid of Figs. 13–18, inclusive.

The most common use of these devices, and necessarily the magnetic chuck with which they operate, is that of holding work in grinding machines. Here, the chuck is mounted on the bed of the machine so as to move with reciprocal motion into the path of a rotating grinding wheel. The V-block 20 is placed on the chuck 67, in a manner illustrated in Fig. 13, with its contact points such as 43, 44, and 45 resting on the poles of the chuck having like signs and the points 47 and 48 (not visible) resting on poles of opposite sign. Either large or small work-pieces may be held depending on which channel of the block is used, and the piece moved into contact with the grinding wheel where the cut is made.

The advantage gained in having two different sized V's is clearly illustrated in Figs. 14 and 15. For example, sufficient magnetic forces could not be applied to a work-piece 68 to hold it securely against the action of grinding wheel 69, if it were carried in the small V 70. The large V 71, on the other hand, fully accommodates the piece and presents adequately sized holding surfaces for it. Further, if a small diameter piece 72 were held in the large V the channel surfaces might interfere with the wheel for large flat cuts, although no question of holding strength would be involved. When held in the small V, however, sufficient holding strength is provided and the horizontal diameter of the piece rests above the face of the block.

For end cuts, the block 20 may be placed endwise on the chuck or similarly used to hold an angular piece 73 (Fig. 16) which would otherwise have to be jigged.

In addition to the feature of the invention which provides for holding stock for end cuts, such as is shown in Fig. 17, an advantage pertaining to saftey is gained. Heretofore, a work-piece, such as 74, has been clamped in the V of an ordinary block and the block in turn clamped or held magnetically to the reciprocating carrier of the machine. When work, thus held, is moved into the path of a grinding wheel, whose cut has been set too deep, damage to the machine, as well as to the work-piece, invariably results. This is not possible, however, when the piece is releasably held by the present magnetic block, for as the work is moved against the wheel 75, Fig. 18, it is "kicked" out of the V, and the work alone is damaged.

At this point, attention should be directed to Figs. 5 and 6. Here, it will be noted that the contact points on one end extend across the bars at right angles to the front face of the block while on the other end they are parallel to it. Thus the block may be used in two positions for end cuts.

It is apparent that many changes may be made in the structure of the device described and in the method of making it without departing from the scope of the invention. Insofar as such modifications fall within the scope of the appended claims, they are included as if described.

What is claimed is:

1. A magnetic work-holding device for use with a magnetic chuck comprising in assembly a plurality of metallic bars exhibiting magnetic properties and having a plurality of angular surfaces, means for holding said bars in opposed parallel relationship with each other, a non-magnetic separator disposed between said bars, said angular surfaces of the latter forming a plurality of work-holding channels extending longitudinally of said assembly, a plurality of non-magnetic inlays inserted in the faces of said bars whereby a plurality of magnetic pole contact points are formed, said contact points lying in two pairs of parallel planes which are at right angles with each other.

2. In a work-holding device for use with a magnetic chuck, a plurality of parallel magnetic bars and a non-magnetic member separating said bars, and a plurality of non-magnetic inlays placed in, and a plurality of magnetic contact points formed on, external surfaces of said bars, said inlays and said contact points providing smooth and uninterrupted bearing surfaces for supporting the device on said chuck.

3. In a work-holding device for use with a magnetic chuck, a pair of parallel metallic bars having magnetic properties, a non-magnetic member separating said bars, a plurality of non-magnetic inlays in the bearing surfaces of said bars and a plurality of non-magnetic holding elements extending through said bars and said member, said holding elements exhibiting a continuous holding force on said bars.

4. A work-holding device for use with a magnetic chuck comprising in assembly a pair of metallic bars having angular surfaces arranged in opposition to form a plurality of work-holding channels extending longitudinally of said assembly, a non-magnetic member disposed between said bars, a first group of non-magnetic inlays inset in selected faces of said bars and lying in planes parallel to said work-holding channels and a second group of non-magnetic inlays inset in other faces of said bars lying in planes at right angles to said work-holding channels, all being arranged so that a work-piece may be held in said work-holding channels in at least two positions, each at an angle with the other.

HAROLD A. SNECKNER.

REFERENCES CITED

The following references are of record in the file of this patent:

UNITED STATES PATENTS

| Number | Name | Date |
|---|---|---|
| 1,254,664 | Downes | Jan. 29, 1918 |
| 1,301,135 | Karasick | Apr. 22, 1919 |
| 1,330,558 | Simmons | Feb. 10, 1920 |
| 1,895,129 | Jones | Jan. 24, 1933 |
| 2,104,472 | St. Clair | Jan. 4, 1938 |
| 2,113,874 | Chanik | Apr. 12, 1938 |